(12) United States Patent
Arab

(10) Patent No.: US 12,182,654 B1
(45) Date of Patent: Dec. 31, 2024

(54) AUTOMATING OIL AND GAS DRILLING SITE OPERATION PROCESSES USING ARTIFICIAL INTELLIGENCE

(71) Applicant: Saudi Arabian Oil Company, Dhahran (SA)

(72) Inventor: Ryan Majdi Arab, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/339,776

(22) Filed: Jun. 22, 2023

(51) Int. Cl.
*G06K 7/10* (2006.01)
*G06K 19/077* (2006.01)

(52) U.S. Cl.
CPC ... *G06K 7/10366* (2013.01); *G06K 19/07762* (2013.01)

(58) Field of Classification Search
CPC .................. G06K 7/10366; G06K 19/07762
See application file for complete search history.

(56) References Cited

U.S. PATENT DOCUMENTS

| | | | |
|---|---|---|---|
| 7,698,160 B2 | 4/2010 | Beaven et al. | |
| 8,306,842 B2 | 11/2012 | Rahi et al. | |
| 8,918,430 B2 | 12/2014 | Fischer | |
| 10,260,332 B2 | 4/2019 | Israel et al. | |
| 10,301,922 B2 | 5/2019 | Abbassian et al. | |
| 11,242,742 B2 | 2/2022 | Andresen et al. | |
| 11,519,257 B2 | 12/2022 | Magana-Moro et al. | |
| 2005/0209912 A1 | 9/2005 | Veeningen et al. | |
| 2022/0066835 A1 | 3/2022 | Shindin et al. | |
| 2023/0039147 A1 | 2/2023 | Gutarov et al. | |

FOREIGN PATENT DOCUMENTS

| | | |
|---|---|---|
| JP | 2013117959 | 6/2013 |
| JP | 6122621 | 4/2017 |

OTHER PUBLICATIONS

Y. Gao, C. Guo, F. Li and Y. Mao, "Real Time Trajectory Parameters Measurement on Machine Learning for Intelligent Drilling," 2020 10th International Conference on Power and Energy Systems (ICPES), Chengdu, China, 2020, pp. 300-304, doi: 10.1109/ICPES51309.2020.9349639. (Year: 2020).*

\* cited by examiner

*Primary Examiner* — Matthew Mikels
(74) *Attorney, Agent, or Firm* — Fish & Richardson P.C.

(57) ABSTRACT

Systems and methods include a computer-implemented method for managing operations. A detailed sequence of drill site operations for each rig in a fleet is used to determine a time schedule for the detailed sequence of drill site operations, identifying routine operational steps and dependent prerequisite activities required to proceed to each next operational step. A critical path for drill site operations is determined based on the time schedules. A shortened critical path is created using machine learning on the drill site operations. Suggestions of possible next steps for an in-progress drilling operation using the shortened critical path are provided in real time. A sequence of operations is optimized using a user-selected suggestion. Materials and services requests are automated. Location information of personnel authorized to perform a task at a rig is collected. A determination is made that the personnel can perform the task. Notifications to perform the task are provided.

17 Claims, 11 Drawing Sheets

| LTRL | HS (in) | Time Category | OP Remarks | Drive Equipment | Drive Technology | Start Depth (ft) | End Depth (ft) | Lower Limit | | | Upper Limit | | |
|---|---|---|---|---|---|---|---|---|---|---|---|---|---|
| 402 | 404 | 406 | 408 | 410 | 412 | 414 | 416 | Hours | Days | Cum. Days | Hours | Days | Cum. Days |
| | | | | | | | | 418 | | | 420 | | |
| 0 | 42 | DR | | TDS | D | 0 | 120 | 0 | 0 | 0 | 0 | 0 | 0 |
| 0 | 42 | FL | | | | 120 | 120 | 0 | 0 | 0 | 0 | 0 | 0 |
| 0 | 34 | DR | | TDS | D | 0 | 774 | 55.5 | 2.31 | 2.31 | 78.64 | 3.28 | 3.28 |
| 0 | 34 | FL | | | | 774 | 774 | 27 | 1.13 | 3.44 | 39.44 | 1.64 | 4.92 |
| 0 | 28 | DR | | MMOT | DMR | 774 | 2,540 | 38.68 | 1.61 | 5.05 | 71.35 | 2.97 | 7.89 |
| 0 | 28 | FL | | | | 2,540 | 2,540 | 28 | 1.17 | 6.22 | 84.88 | 3.54 | 11.43 |
| 0 | 22 | DR | | TDS | D | 2,540 | 4,818 | 39.87 | 1.66 | 7.88 | 89.75 | 3.74 | 15.17 |
| 0 | 22 | FL | | | | 4,818 | 4,818 | 72 | 3 | 10.88 | 122.22 | 5.09 | 20.26 |
| 0 | 16 | DR | | TDS | D | 4,818 | 10,373 | 88.88 | 3.7 | 14.58 | 221.64 | 9.24 | 29.5 |
| 0 | 16 | FL | | | | 10,373 | 10,373 | 101 | 4.21 | 18.79 | 149.54 | 6.23 | 35.73 |

AUTOMATING OIL AND GAS DRILLING SITE OPERATION PROCESSES USING ARTIFICIAL INTELLIGENCE

TECHNICAL FIELD

The present disclosure applies to performing tasks associated with drilling operations.

BACKGROUND

Drilling operations, at locations such as drilling rigs and platforms, typically use techniques for performing and reporting daily drilling operations activities that include generating a daily game plan. For example, the daily game plan may be printed and distributed at the beginning of a shift (e.g., in the morning). The daily game plan may follow a drilling program for a given drilling location. The daily game plan may be distributed to the drilling contractor crew with a list of detailed step-by-step actions. In some cases, additional, last-minute operational activities may occasionally arise, causing interruptions in the drilling operations' sequence. The additional, last-minute operational activities may arise, for example, due to an overlooked/forgotten prerequisite step. In such cases, the resulting daily game plan may rely on the drill site supervisor's experience and knowledge of a possible optimized sequence of activities. There may be a big variance in the way that different supervisors approach such issues, including capturing possible offline activities to maximize performance, enhance operational efficiency, and minimize a critical path of operational tasks that are to be completed.

SUMMARY

The present disclosure describes techniques that can be used for automating oil and gas drilling site operation processes using artificial intelligence. In some implementations, a computer-implemented method includes the following. A detailed sequence of drill site operations for each rig of a fleet of rigs is stored in a repository at a centralized system. A time schedule for the detailed sequence of drill site operations is determined by the centralized system for each detailed sequence of drill site operations. The detailed sequence of drill site operations is determined using the repository and identifies routine operational steps and dependent prerequisite activities required to proceed to each next operational step in each detailed sequence of drill site operations. A critical path for drill site operations is determined by the centralized system based on at least the time schedules for the detailed sequence of drill site operations for each rig. A shortened critical path is created by the centralized system based on the critical path using machine learning on the drill site operations. Suggestions of possible next steps for an in-progress drilling operation using the shortened critical path are provided in a user interface by the centralized system in real time. A sequence of operations for the in-progress drilling operation is optimized by the centralized system using a user-selected suggestion. Materials and services requests are automated by the centralized system. Location information of personnel authorized to perform a task at a rig is collected by the centralized system. A determination is made by the centralized system using the location information that the personnel can perform the task. Notifications to perform the task are provided by the centralized system to the personnel.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. Daily game/action plans of a drilling rig crew can be manually generated and updated in real-time. The reliance on individuals to optimize their daily job tasks and rig activities can be eliminated. Interruptions and wait times can be avoided that are associated with high standby times of both rig crew and critical drill site equipment followed by high demand of both. The techniques can solve the technical problem of a lack of automated systems for optimizing sequences of drill site non-drilling activities (e.g., flat time operations). The techniques can provide the ability to monitor the progress of crew activities in real-time from an office or other remote location. The techniques can provide the ability to identify critical rig equipment activities to properly make use of stagnant time. The techniques can solve the technical problem of identifying possible offline and simultaneous activities and maximize the use of a drilling crew integrated with other rigs in the fleet. The techniques can solve the technical problem of the reliance on manual requests of materials and services that may cause delays in deliveries or avoidable emergency orders. The techniques can provide an integrated, automated system with suppliers, including triggering requests to suppliers automatically based on a current stage in a predefined sequence of operations. The daily game plan of a crew's required activities can be autonomously generated. An artificially intelligent engine can suggest an optimized process in real-time. An optimized sequence of operations can be plotted and available in real-time and for all rigs in a fleet. The techniques can provide a centralized database for exchanging and sharing optimizations. The techniques can maximize offline activities and reduce total well time in drilling rigs operations. The techniques can be used to learn and distribute rig fleet lessons learned to an entire organization through an integrated system. The techniques can be used to eliminate human errors associated with logistics delays. The techniques can be used to eliminate operations interruptions and last-minute callout service or material requests. The techniques can be used to eliminate the reliance of personnel's triggers to remember a missing item or service. The techniques can be used to provide real-time task completion monitoring pushed to rig site supervisors, e.g., using radio frequency identification chip (RFID) technology. The techniques can alert rig site supervisors of standby rig crew durations through RFID tags signed in at non-work location (e.g., smoking areas).

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIG. 4 is a diagram showing an example spreadsheet listing drilling tasks and expected durations, according to some implementations of the present disclosure.

FIG. 9 is a spreadsheet showing an example of a display, according to some implementations of the present disclosure.

Like reference numbers and designations in the various drawings indicate like elements.

DETAILED DESCRIPTION

Figure 1:
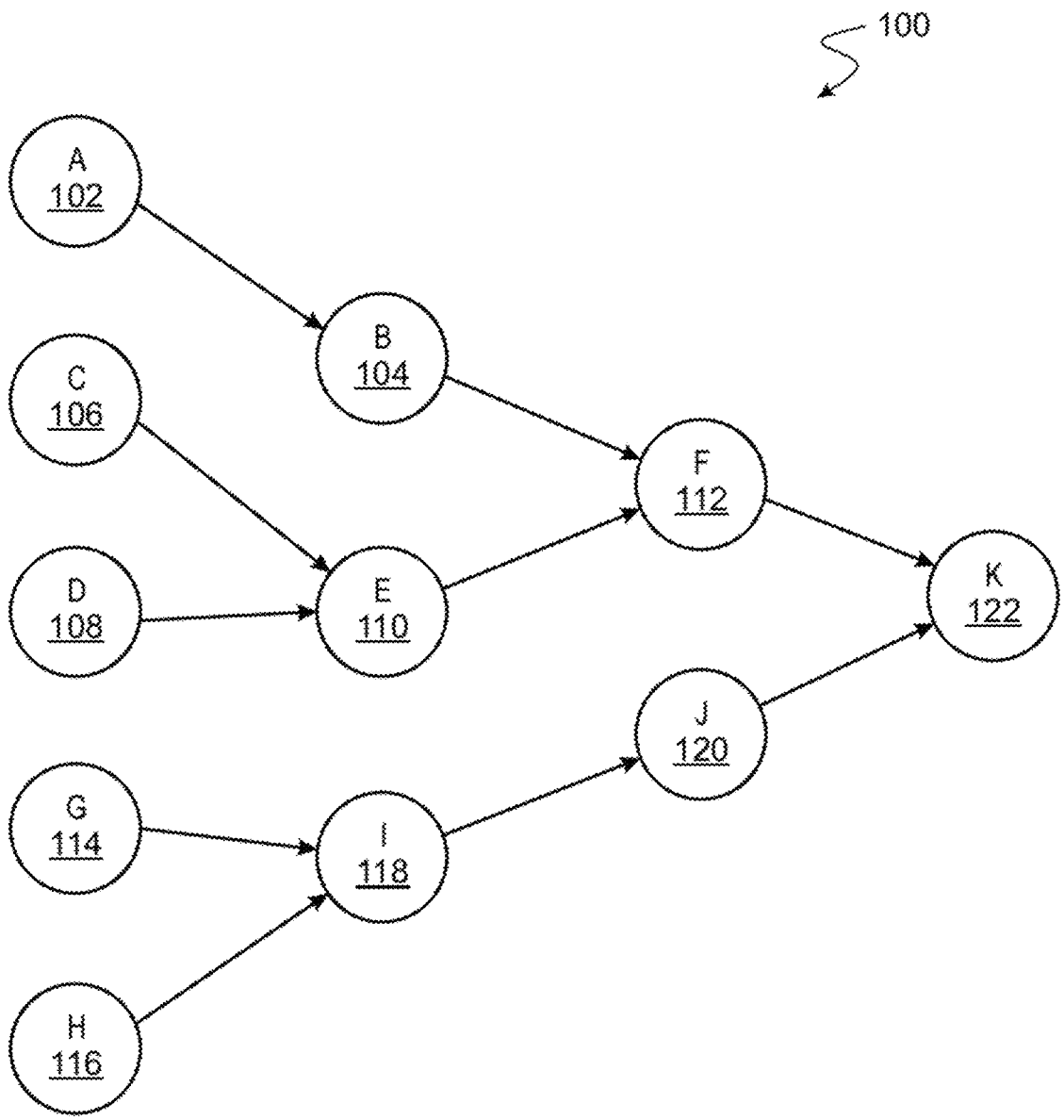
FIG. 1 is a diagram showing an example of a plot including task nodes representing tasks, according to some implementations of the present disclosure.

The following detailed description describes techniques for automating oil and gas drilling site operation processes using artificial intelligence. Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The present disclosure identifies a system that can be used to enhance the drilling site operations and processes by providing a drilling site supervisor with an automated and optimized sequence of routine tasks and non-drilling tasks (flat time activities). The system can use artificial intelligence (AI) and can be powered by an AI-powered algorithm trained to achieve the most efficient sequence of operations by capturing and learning from the entire rig fleet's optimized sequence of operations. Optimization, for example, can refer to (or be measured by) achieving efficiency or an efficiency improvement above a threshold percentage. This can be achieved by plotting, at a centralized system, every detailed sequence of drill site operations performed by all rigs. This can include plotting out a time schedule of the routine operations' steps and the dependent prerequisite activities required to proceed to the next sequence of operations. This can include recording all possible steps at each stage across the fleet, and capturing all possible offline/simultaneous activities to shorten the operation's critical path. As a result, at a subsequent site, the system can suggest possible next steps using machine learning to determine and identify an optimized sequence of steps to be performed. In addition, the system can propose possible simultaneous steps to be performed to maximize offline activities using stand-by equipment/rig crew. This can include minimizing online activities and eliminating ad hoc, last-minute activities that arise occasionally due to poor planning or that have a high reliance on a well site leaders' experience.

In some implementations, the critical path can be determined based on estimated times for tasks to complete. As an example, a critical path can be determined from estimated times from actual previous similar operations at other drill sites. Operations can be, e.g., completion of a blowout preventer (BOP) make up or running casing to bottom with all its related operations. Running 9⅝" casing, for example, typically requires 18 joints per hour (e.g., based on field averages). This includes all related sequences of operations to get the casing from surface to bottom from inspecting, picking up, torque up, graph verification, and running in open hole to bottom. Follow-up operations for running casing can include cementing, followed by BOP make-up. All these three operations have a critical path of their own that can't start until the prerequisite operation is complete, e.g., the casing reaches the bottom, and then cementing can commence.

The allocated time for each activity required by a task can be graphically plotted. The plots can include simultaneous activities that can be performed in parallel in a time schedule. The time allocated for each activity can be determined based on the actual time that other rigs took while performing similar operations. This can enable the generation, using information from a centralized database, measurable key performance indicators (KPIs) of each small routine step. Doing so can provide a more efficient operational sequence with a dedicated system to plot and map the daily and hourly sequence of tasks/activities. This can also facilitate highlighting an operation's critical path, offline activities, personnel responsible for the task, and the time allocated to each task. The centralized system can enable a real-time live view of the current activity/task being performed. The progress on the critical path of the drilling site operations can be provided with a detailed or summarized view available in the office or other remote locations for use by drilling engineers and superintendents. The information can be available, for example, through the web, through a live and real-time view of the daily morning report.

Furthermore, using the recorded sequence of operations, the drilling site supervisor can use the system to generate the performed daily activities in a morning report format simultaneously with a summary of the performed operations during a given time period (e.g., the last 24 hours). This can eliminate the need for the manual entry of the daily morning reports and the subjectivity associated in the operations' descriptions and timing.

In addition, utilizing an AI engine and a registered sequence of operations, the system can automate triggers to identify necessary materials and services, e.g., for orders sent to suppliers and service providers at an ideal time based on a sequence of operations. This can reduce or eliminate delays associated with suppliers by eliminating a reliance on human factors (e.g., by a drilling site supervisor) in remembering the appropriate times to request materials/services. As a result, emergency material requests can be reduced, and transportation and logistics efficiency can be optimized.

In some implementations, a database can be used to receive and store a repository of information about small operational steps that are continuously recorded for all rigs operations. Using this information, more accurate estimated times for small tasks can be generated based on actual historical data and provided to site supervisors and office engineers. The information can also enable a thorough and detailed systemized tracking of a drilling contractor crew's performance and efficiency.

An AI engine can be used with a Gantt chart to plot all sequences of tasks to develop the drilling operations' critical path. Doing so can enable consistency in maximizing the tasks' efficiency when performed simultaneously (or "offline"), which can better utilize a drilling contractor crew's time and shorten the critical path of drill site operations. The AI engine can be used to shorten a critical path, for example, by maximizing offline activities and by maximizing the use of standby tools and crew. This will enable a shorter critical path that includes a follow-up sequence of operations. For example, the critical path for rigging up the BOP operation may require 244 minutes and 6 crew members using 4 different pieces of rig equipment. As there are typically standby crew members waiting on this task to be completed to get to their own tasks, the system can alert the crew members or their superiors of another task that they are capable of performing in the interim. At the same time, available rig equipment can be used, for example, to start to mix the next section's drilling fluids or to prepare the BOP pressure testing equipment (also on stand-by), which will minimize the follow-up sequence of operations. The follow-up sequence can include, for example, BOP pressure testing, wellhead welding, and drilling fluids mixing.

An AI-generated critical path that is used in daily drilling routine operations can drive efficiency and automate an operation's daily game plans by leveraging a historical database as a strong foundation for identifying dependencies between tasks and the tasks' duration times. An AI engine can be trained to develop the best possible sequence of operations and to suggest an optimized sequence of tasks to a drill site supervisor. Selected and executed process enhancements can be captured from all rigs' operations and stored in a centralized database. Actual times consumed by each task can be verified by rig sensors' data and drill site crew log sheets. This can enable the development of an integrated database for capturing the time required for each small activity across the entire fleet. Driven by data, drilling site supervisors can send specific targets for each small task to the drilling contractor crew for each routine task to be achieved. In addition, this can enable an auto-generation of the critical path for new operations, with daily tasks that follow a company's safety standards and provide consistency in performance.

Furthermore, current daily operations reporting methods include the manual entry of activities performed and the time consumed. The level of detail in both the operation performed and the allocated time is entirely up to a drill site supervisor. Some drill site supervisors may spell out the detailed steps for each operation and its expected time consumed, and some drill site supervisors may combine multiple steps into a single line item and combine the time consumed. By contrast, an automated system that implements the techniques of the present disclosure can generate a daily game plan and automatically report detailed steps and time they require for completion. Automated verification using crew log sheets and rig sensors data can be used to automatically generate daily morning reports, eliminating at least 90% of drill site supervisor's reporting efforts. In addition, the techniques can enable a real-time morning report view (e.g., live) instead of waiting until the next morning to see the past 24 hours of operation.

Lastly, the system can also enhance the logistics efficiency and minimize emergency call-outs and materials ordering. Current practices depend on dedicated personnel to order materials and services at appropriate times, considering the current operation sequence. It is important, for example, not to order materials too early or too late because of limited site space, service charges, and potential degradation of materials. By contrast, utilizing the AI engine and the centralized database to log routine tasks and effective lead time for materials/services, a notification can appear to a supervisor's workstation, for example, identifying materials and services to be ordered at appropriate times corresponding to the sequence of operations. The supervisor can then act on the notification, e.g., by selecting an option to complete an order that is displayed. In this way, logistics can be managed with an automated trigger to the materials' suppliers, a company's tool house, and service providers. A further step towards full automation can occur after verification of the system's accuracy, e.g., by automating the entire process of materials/services ordering. This can reduce or eliminate emergency call-outs, minimize stagnant inventory, and maximize inventory turnover. A further application of the system is an algorithm to manage experienced personnel for more complex jobs to better utilize the experienced personnel at the appropriate time to reduce failures.

Example: Considering the Make-Up of a Drilling Bottom Hole Assembly on a Rig Floor In an example that considers the make-up of a drilling bottom hole assembly on a rig floor, a full breakdown of the routine drilling site operations tasks and activities can be made. Each activity can be assigned to designated personnel or a job role/suffix (e.g., derrick man, floor man, roustabout, etc.). Breaking down this task into its lowest-level of activity can include, in the current example: inspecting a rotary steerable system assembly, ordering a pick up to the rig floor, a forklift pick up, a hook tie-in, and receiving on the rig floor by crane, to name a few.

Each task can be assigned to a responsible crew member by name or by job role/suffix. Each task can be broken down by the time it requires, the task's relationships to each other tasks (e.g., pre-requisite or independent), and the expected time for task completion. Each time can be estimated based on the rig fleet performance while performing the same routine tasks. The KPI for each small task can be based on the actual average time from other rigs (to complete the task) or the time experienced and expected by top-performing rigs (e.g., based on a companies' field strategy and risk tolerance). All personnel involved in the completion of this task can be registered.

Follow-up tasks can be broken down using the same technique. Each task can be categorized as being either capable of being a simultaneous task or as a prerequisite/consequential task. The system can record all such operations at all rigs in the fleet. AI techniques (e.g., machine learning) can be applied to plot and learn the most optimized process and the relationship of each task. As a result, a drill site supervisor using the system can construct and define a daily game plan for completing the required objective (in this example, the make-up of the drilling bottom hole assembly). For example, a suggested task sequence for achieving a targeted operation is presented by the system. The suggested task sequence, including a set of all possible consecutive steps, including suggestions for applicable offline operations, is presented for selection by the user. Sequencing can occur for drilling activities and for non-drilling (of "flat time") activities such as inspecting, picking up casing, running casing, blowout preventer (BOP) make up and testing, wellhead work, and rig equipment preventive maintenance. A rig's specific efficiency level at performing offline activities can also be learned by the system over time using machine learning.

The identification of the potential possible offline operations can be made at this point, maximizing the use of the available personnel and equipment scarce resources (e.g., cranes, forklifts, mud tank mixers, hoppers, etc.). Cranes, for example, typically exist in limited numbers at the drill site, and many tasks are often waiting on the same crane. Yet, at other times, the crane can be found to be stagnant and on standby. As a result, when information is presented graphically to a user, the crane, and similar scarce rig equipment can be presented using different types of shading (or using special colors) in a graphical activity schedule, e.g., to identify the crane as being on the critical path so as to better utilize the crane's time.

Upon completing a threshold percentage (e.g., 70%) of the section's drilling completion, an automated notification can be made to a casing running service provider. Similar other required materials can be made in the same manner ahead of time. The performed activity, based on the accepted sequence, can then be inserted autonomously in a morning reports system. The information used can be generated from the performed tasks and the time consumed, e.g., using some information from the same centralized system. The KPI for each specific step can be derived from actual executed operations that are used to benchmark high performing rigs.

The techniques include recording, a table format, each specific task, its duration, and the crew member(s) (e.g., derrick man, roustabout tool pusher, and roustabout) capable of performing the task. Interdependence to other tasks is also defined, e.g., with a YES/NO designation. If the designation is YES, then a link to the predecessor task(s) is also defined to establish a network of prerequisite tasks. In some implementations, the information can be stored in a table such as Table 1. Using information in Table 1, an overall task sequence can be plotted (e.g., as shown in FIG. 1) using flow chart enabling software.

FIG. 1 is a diagram showing an example of a plot 100 including task nodes 102-122 representing tasks, according to some implementations of the present disclosure. The task nodes 102-122 represent tasks A-J summarized in Table 1. As shown by arrows in the plot, some of the tasks 102-122 have one or more predecessors, as further indicated in the Immediate Predecessor(s) column of Table 1. In FIG. 1 and using time information (e.g., in minutes (min.)) in Table 1, a critical path is indicated by the path C-E-F, because that path has the longest duration.

TABLE 1

Task Network

| Work Task | Time (Minutes) | Immediate Predecessor(s) | Capable Crew Member |
| --- | --- | --- | --- |
| A | 12 | — | Roustabout |
| B | 60 | A | Derrick man and above |
| C | 36 | — | Chief Roustabout |
| D | 24 | — | Floor man |
| E | 38 | C, D | Driller and Assistant Driller |
| F | 72 | B, E | Floor man and above |
| G | 14 | — | Derrick man and above |
| H | 72 | — | Roustabout |
| I | 35 | G, H | Driller and Assistant Driller |
| J | 25 | I | Chief Mechanic |
| K | 47 | F, J | Driller and Tool Pusher |
| Total = | 435 | | |

In some implementations, a linear regression method using Excel Solver can be used to optimize the prioritization of tasks, e.g., using an objective function to minimize the total time required. A live (e.g., real-time) system can be used to continuously monitor crew movement, e.g., using radio frequency identification chip (RFID) sensors installed in hydrogen sulfide ($H_2S$) sensor equipment that each crew member is wearing. As such, the RFID can be an add-on to the $H_2S$ sensor normally worn by the drilling rig crew. This add-on capability can facilitate a paging protocol, e.g., with two buttons to mark two actions: acknowledgment and task completion.

In some implementations, a hub of RFID receivers can be used in each working area (e.g., shale shaker, mud tanks, cement tanks, rig floor, or drill pipe storage). The hub can collect the live location of each crew member from the RFID that the crew member is wearing. Once a crew member is working within a predefined radius of the hub, the live location system can automatically track the crew, e.g., displaying a crew member's name on a live rig location layout screen at a site office.

Task flows can be continuously optimized to reduce the total time needed to complete tasks of an operation. In some implementations, optimization can be realized by executing a series of IF statements, for example: 1) "IF task X and all its required pre-requisite tasks are fulfilled, then . . . "; and 2) "IF a task Y capable performer is not at his designated working space (e.g., is not working, at the resting area, off rig site, or office, as detected by the RFID system), then . . . " Based, at least in part, on the results of executing the IF statements, an existing flow chart of a sequence of operations can be presented, displaying suggestions for an optimized sequence of operations (proposed) (e.g., highlighting differences from a current sequence), including identifying a number of unlocked future tasks.

Linear programming techniques can be used in which all constraints are considered for continuously optimizing the best sequence of operations, such as to shorten the total duration. In some implementations, optimization functions can include three objectives: 1) minimizing total task operation times, 2) prioritizing tasks with the highest dependency of other tasks, and 3) minimizing a crew's non-productive time.

In some implementations, RSTUDIO or other tools can be used to combine large data sets for use in linear programming. In some implementations, EXCEL SOLVER can be used for smaller data sets.

Figure 2:
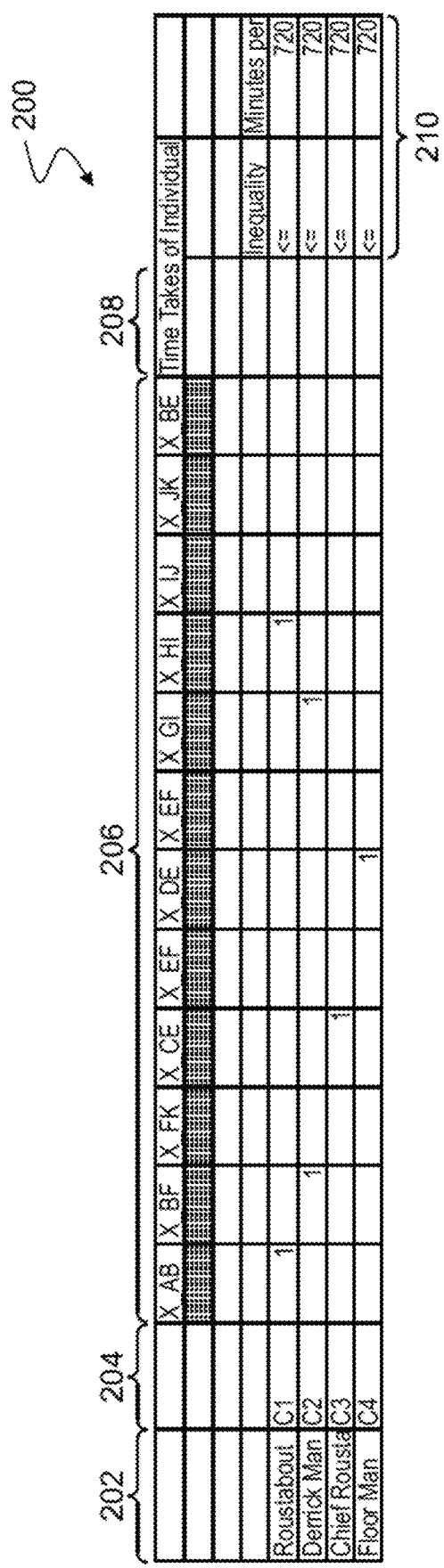
FIG. 2 is a diagram showing an example of a spreadsheet containing task information, according to some implementations of the present disclosure.

FIG. 2 is a diagram showing an example of a spreadsheet 200 containing task information, according to some implementations of the present disclosure. Roles of personnel who can perform the tasks are represented by rows in the spreadsheet 200. The role information for each role includes a role name 202, a role code 204, task codes 206 of tasks that are workable by each role, and durations 208. The values listed in the spreadsheet for each task can indicate the number of personnel for each role needed to complete the task. An entry of 1 indicates true, while a zero/empty entry indicates false, so a process A to B, e.g. X_AB, is performed by roustabout. Entries such as 210 can indicate the maximum allowable minutes per shift. The spreadsheet 200 can represent an EXCEL SOLVER method to generate an optimized sequence of operations while not exceeding available crew members.

Once a new optimized task flow chart is accepted by the wellsite leader, an event can begin to occur automatically. A designated crew member can receive a triggering page (e.g., a predetermined beep) and a message at the designated crew member's H$_2$S monitor (with the installed RFID paging system). The message, e.g., appearing on a small screen, can include instructions to report to a direct report (e.g., supervisor) or to perform a task action. The crew member's direct report can also be notified with a notification of one or more recommended optimized tasks. The notification format can be, for example, "You have crew member X who is capable of performing pending task Z."

Upon completion of the task, one or more of the direct reports and crew members can mark the task as "Complete." The task's workflow will be updated, and the previously-described process of optimization can be repeated.

Figure 3:
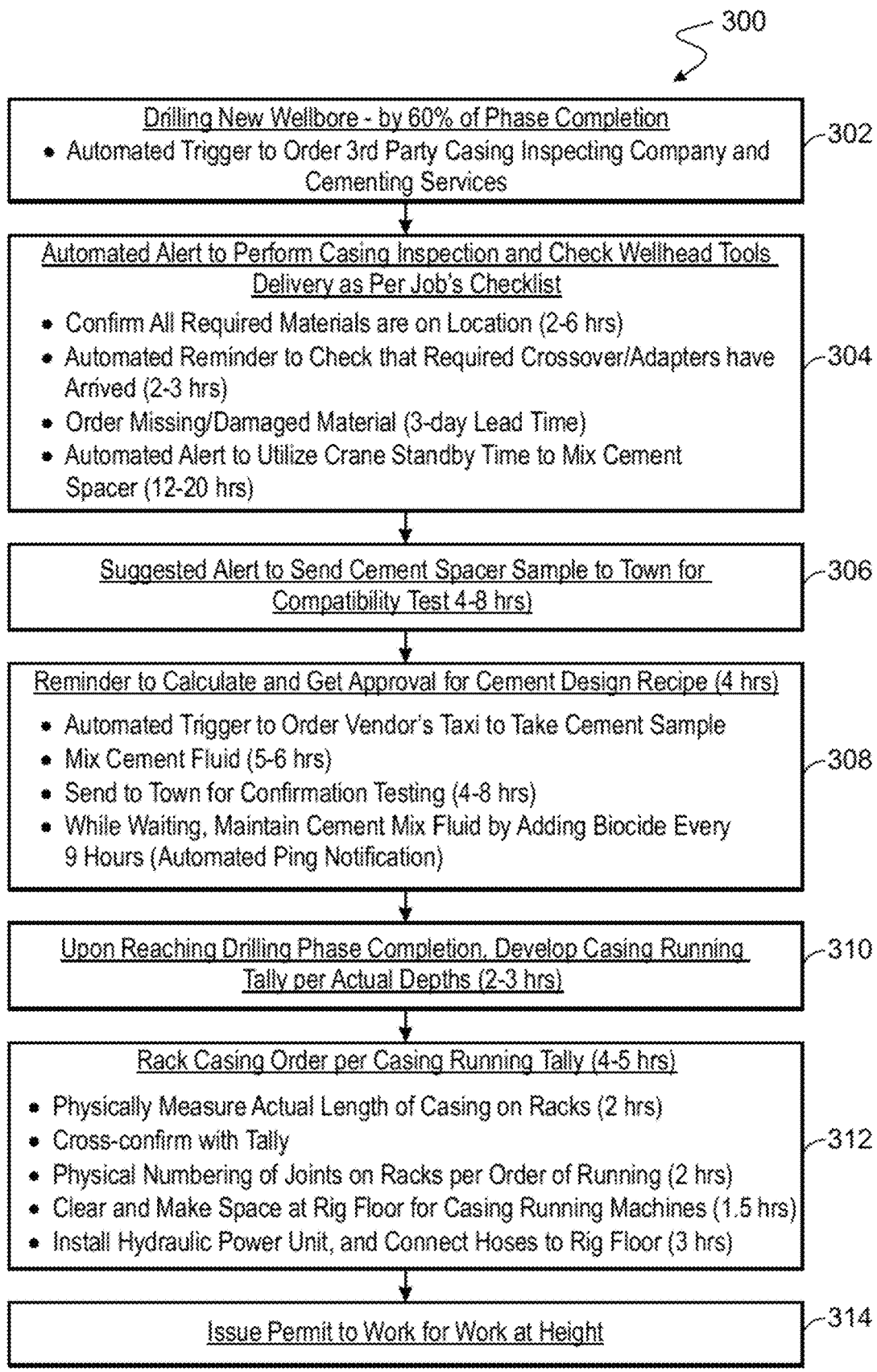
FIG. 3 is a diagram showing an example of a workflow including tasks resulting in the creation of a work permit, according to some implementations of the present disclosure.

Example Resulting in Issued Work Permit:

FIG. 3 is a diagram showing an example of a workflow 300 including tasks resulting in the creation of a work permit, according to some implementations of the present disclosure. Main task headings are underlined, and sub-elements are bulletized.

At 302, a new wellbore is being drilled, and at a threshold completion percentage (e.g., 60% of phase completion), events are triggered for the job. An automated trigger can occur to order the services of a third-party casing inspecting and cementing services company.

At 304, automated alerts are sent to perform casing inspection and check wellhead tools delivery as per the job's checklist. All required materials are confirmed to be on location. This is a task that is expected to require 2-6 hours (hrs). An automated reminder is sent to check that required crossovers/adapters have arrived (2-3 hrs). Missing/damaged materials are ordered (e.g., with a 3-day lead time). An automated alert is sent to utilize crane standby time to mix cement spacer (12-20 hrs).

At 306, a suggested alert is sent for personnel to send a cement spacer sample to a testing facility (e.g., in town) for a compatibility test (4-8 hrs).

At 308, a reminder is sent to calculate and get approval for a cement design recipe (4 hrs). As an example, automated triggers can be sent to order a vendor's vehicle to pick up the cement sample, mix cement fluid (5-6 hrs), that is to be sent to town for confirmation testing (4-8 hrs), and (while waiting) maintain cement mix fluid by adding Biocide every 9 hours (automated ping notification).

At 310, by reaching drilling phase completion, a casing running tally is developed per actual depths (2-3 hrs).

At 312, a rack casing order (per casing running tally) occurs (4-5 hrs), identifying each casing joint as per the casing running tally, where each joint of casing has different lengths, grades, etc., and should be put on a rack as per the casing tally ordering. Automatic alerts can be sent for the individual tasks. The actual length of the casing on the racks is physically measured (2 hrs) and cross-confirmed with a tally. A physical numbering of joints on racks occurs per order of running (2 hrs). Space is cleared, and space is made at the rig floor for casing running machines (1.5 hrs). A hydraulic power unit is installed, and hoses are connected to the rig floor (3 hrs).

At 314, a permit is issued to work for work at height. The permit can include information from the previous tasks.

FIG. 4 is a diagram showing an example spreadsheet 400 listing drilling tasks and expected durations, according to some implementations of the present disclosure. The spreadsheet 400 includes Lateral (LTRL) 402, hole section (HS) size 404 (e.g., in inches), a time category 406 (e.g., with codes drilling (DR) and flat time (FL)), operation remarks 408, drive equipment 410 (e.g., with codes top drive system (TDS) and Mud Motor (MMOT)), drive technology 412 (e.g., with codes convention drilling/rotary drilling (D) and directional drilling using mud motor (DMR)), a start depth 414 (e.g., in feet (ft)), an end depth 416 (in ft), an expected duration lower limit 418 (in hours, days, and resulting cumulative days), and an expected duration upper limit 420 (in hours, days, and resulting cumulative days).

In some implementations, the display of FIGS. 4-8 can be used as performance monitoring tools. For example, techniques for monitor performance can include the tables and graphs of FIGS. 4-8. Some of the information can be derived from the actual performance of other above average performing rigs. Specific detailed operations timing may or may not be monitored.

Figure 5:
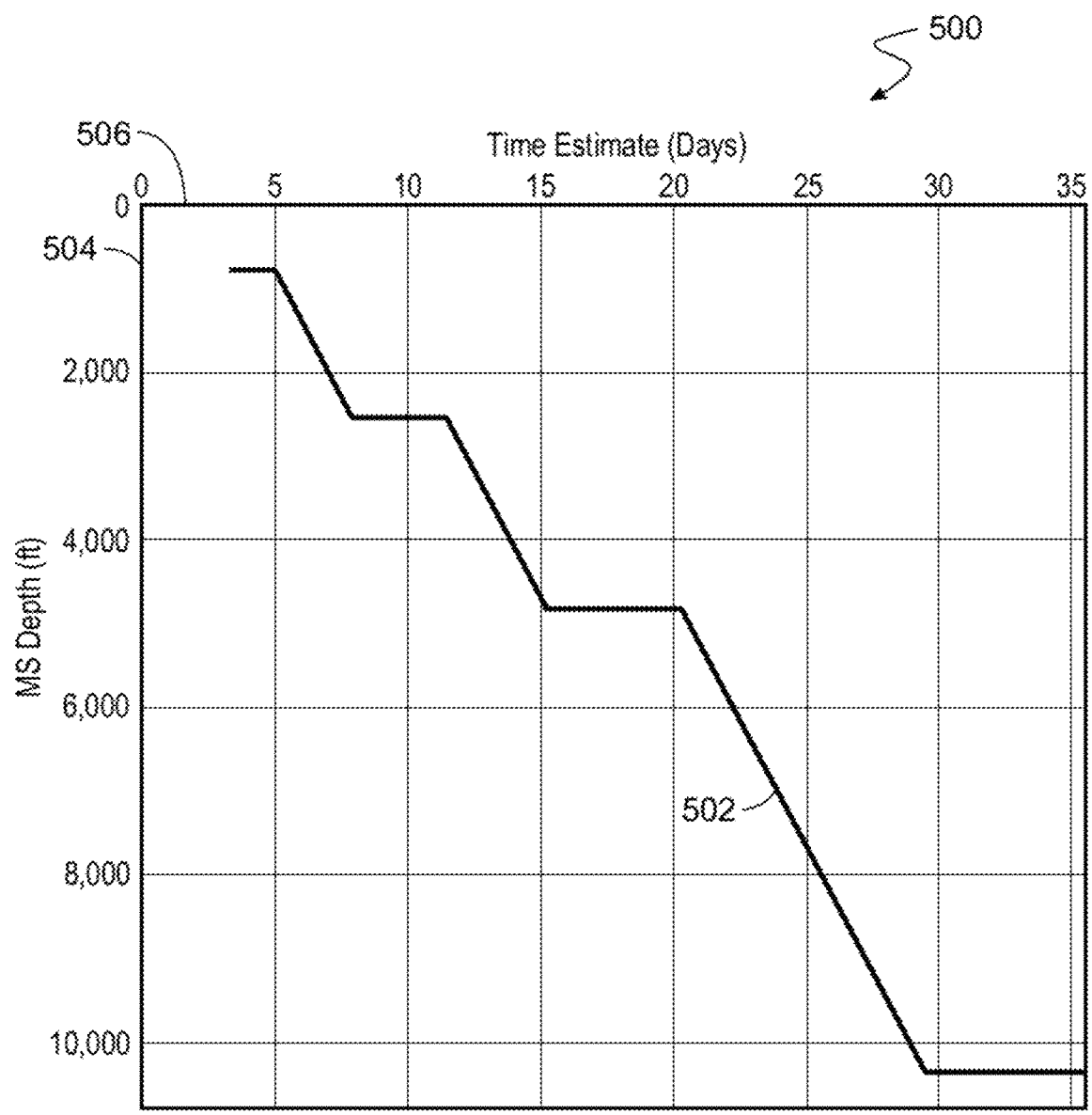
FIG. 5 is a diagram showing an example of a depth-by-time graph, according to some implementations of the present disclosure.

FIG. 5 is a diagram showing an example of a depth-by-time graph 500, according to some implementations of the present disclosure. The depth-by-time graph 500 includes a depth-by-time plot 502, plotted relative to measured depth (MS) 504 (e.g., in feet) and a time estimate 506 (e.g., in days). The display shown in the depth-by-time graph 500 includes a target.

Figure 6:
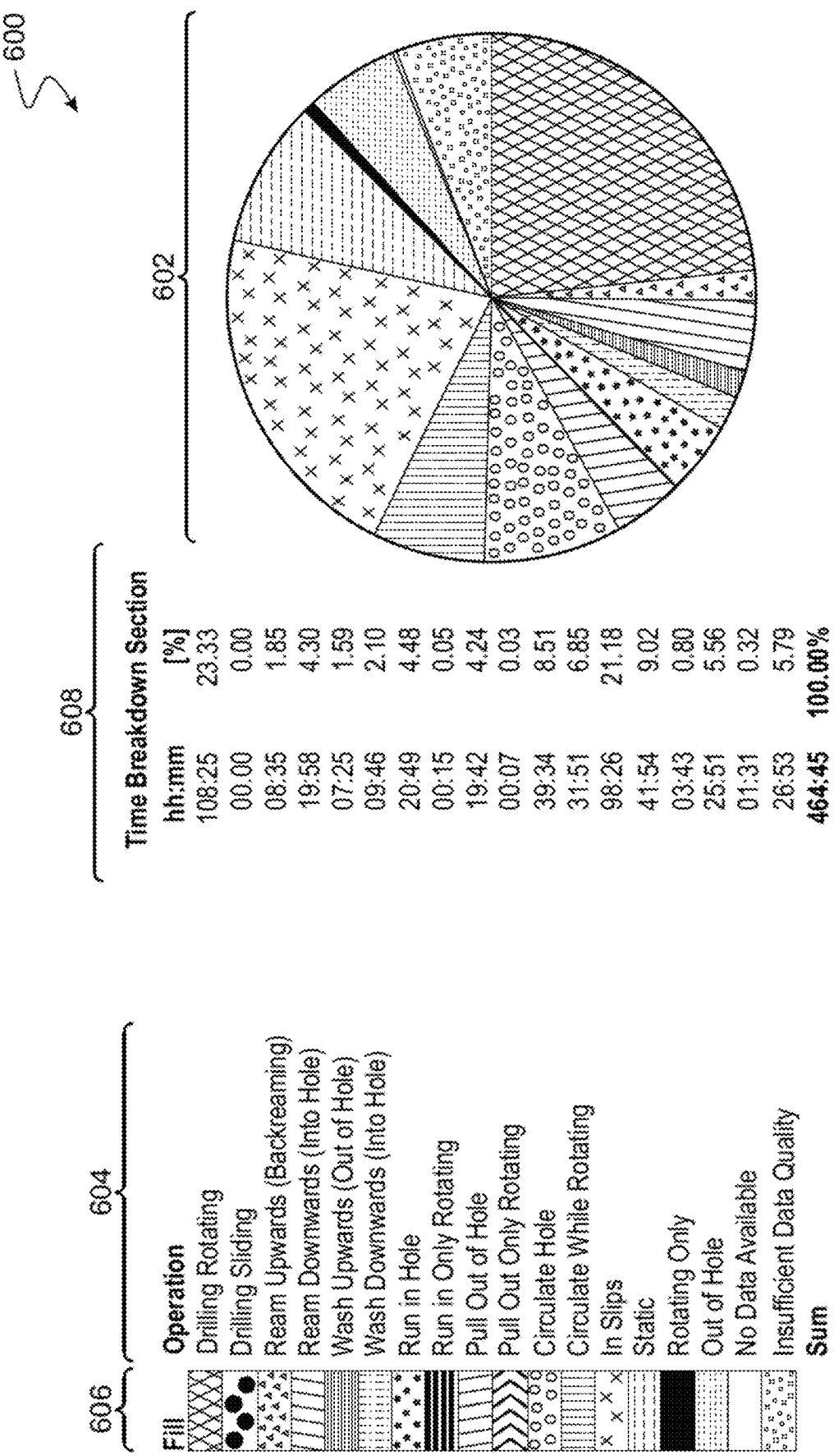
FIG. 6 is a diagram showing an example of a work breakdown display, according to some implementations of the present disclosure.

FIG. 6 is a diagram showing an example of a work breakdown display 600, according to some implementations of the present disclosure. The work breakdown display 600 includes a pie chart 602, operations 604, colors 606 (mapping the operations 604 to the pie chart 602, based on duration), time breakdown 608 (e.g., listing duration in hours, minutes, and seconds), and a percentage of the overall process represented by each operation 604.

Figure 7:
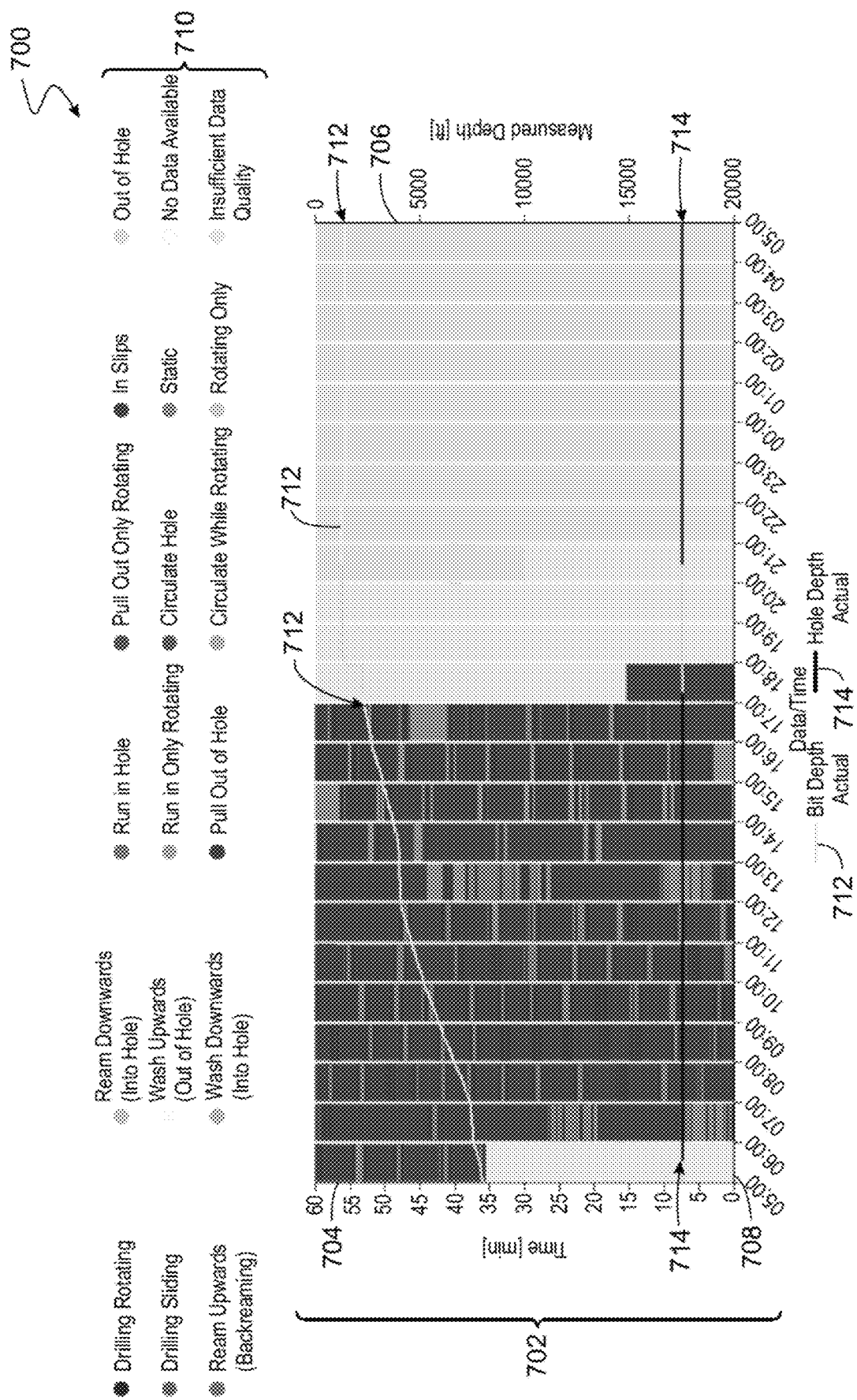
FIG. 7 is a diagram showing an example of a time/depth display, according to some implementations of the present disclosure.

FIG. 7 is a diagram showing an example of a time/depth display 700, according to some implementations of the present disclosure. The time/depth display 700 includes a time chart 702, operations plotted relative to a per operation time 704 (e.g., in minutes) along with a measured depth 706 (e.g., in feet), both plotted relative to date/time 708. Bit depth 712 and hole depth actual 714 are also plotted relative to date/time 708. To aid in identifying the information in the time/depth display 700, key 710 identifies shading (or alternatively using color-coding) indicating the types of entries/tasks in the time chart 702. The types of entries correlate to task types (e.g., drilling rotating, ream downwards (into hole), run in hole, etc.)

Figure 8:
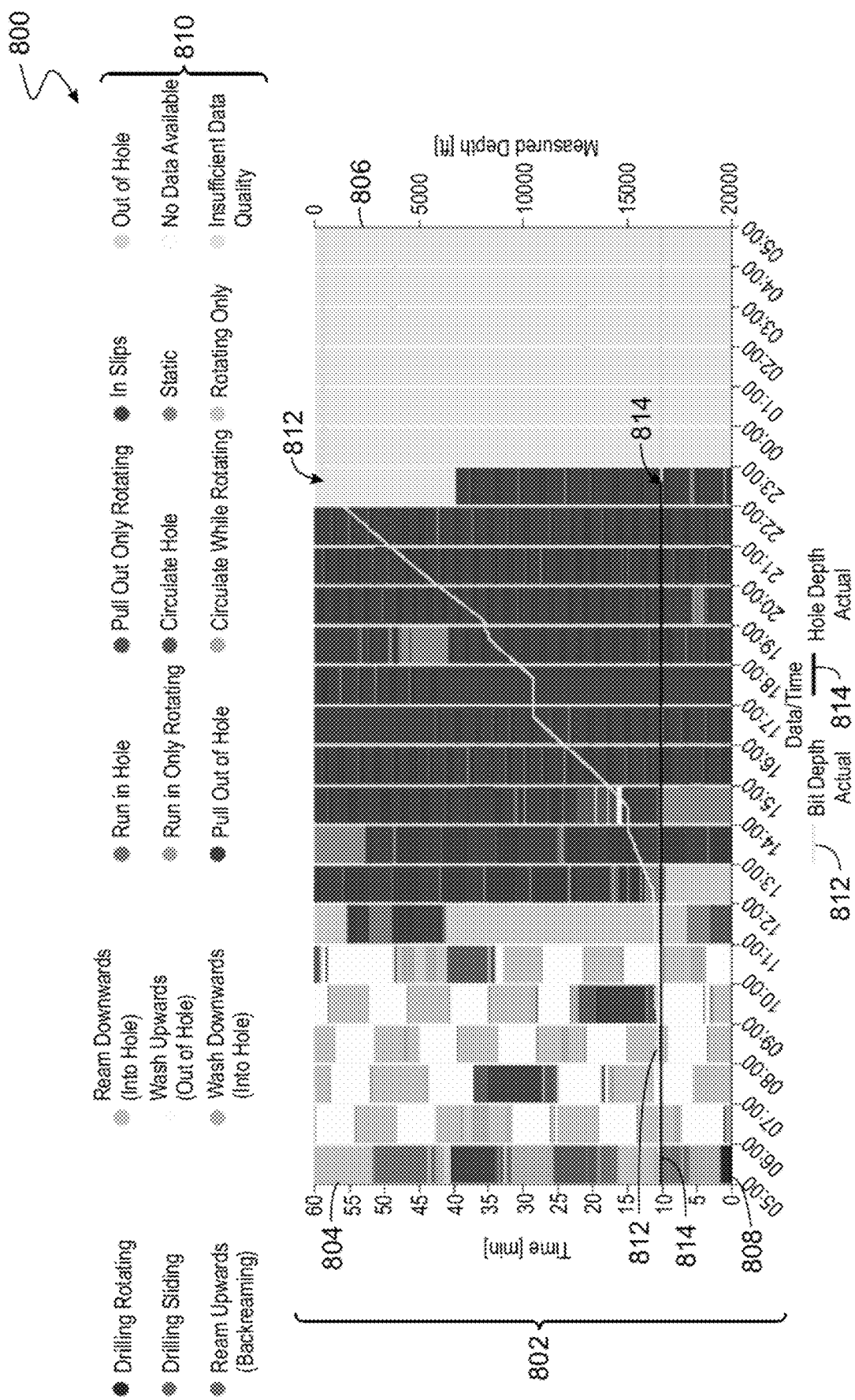
FIG. 8 is a diagram showing an example of a time/depth display, according to some implementations of the present disclosure.

FIG. 8 is a diagram showing an example of a time/depth display 800, according to some implementations of the present disclosure. The time/depth display 800 includes a time chart 802, operations plotted relative to a per operation time 804 (e.g., in minutes) along with a measured depth 806 (e.g., in feet), both plotted relative to date/time 808. Bit depth 812 and hole depth actual 814 are also plotted relative to date/time 808. To aid in identifying the information in the time/depth display 800, key 810 identifies shading (or alternatively color-coding) indicating the types of entries/tasks in the time chart 802. The types of entries correlate to task types (e.g., drilling rotating, ream downwards (into hole), run in hole, etc.)

Figure 9:
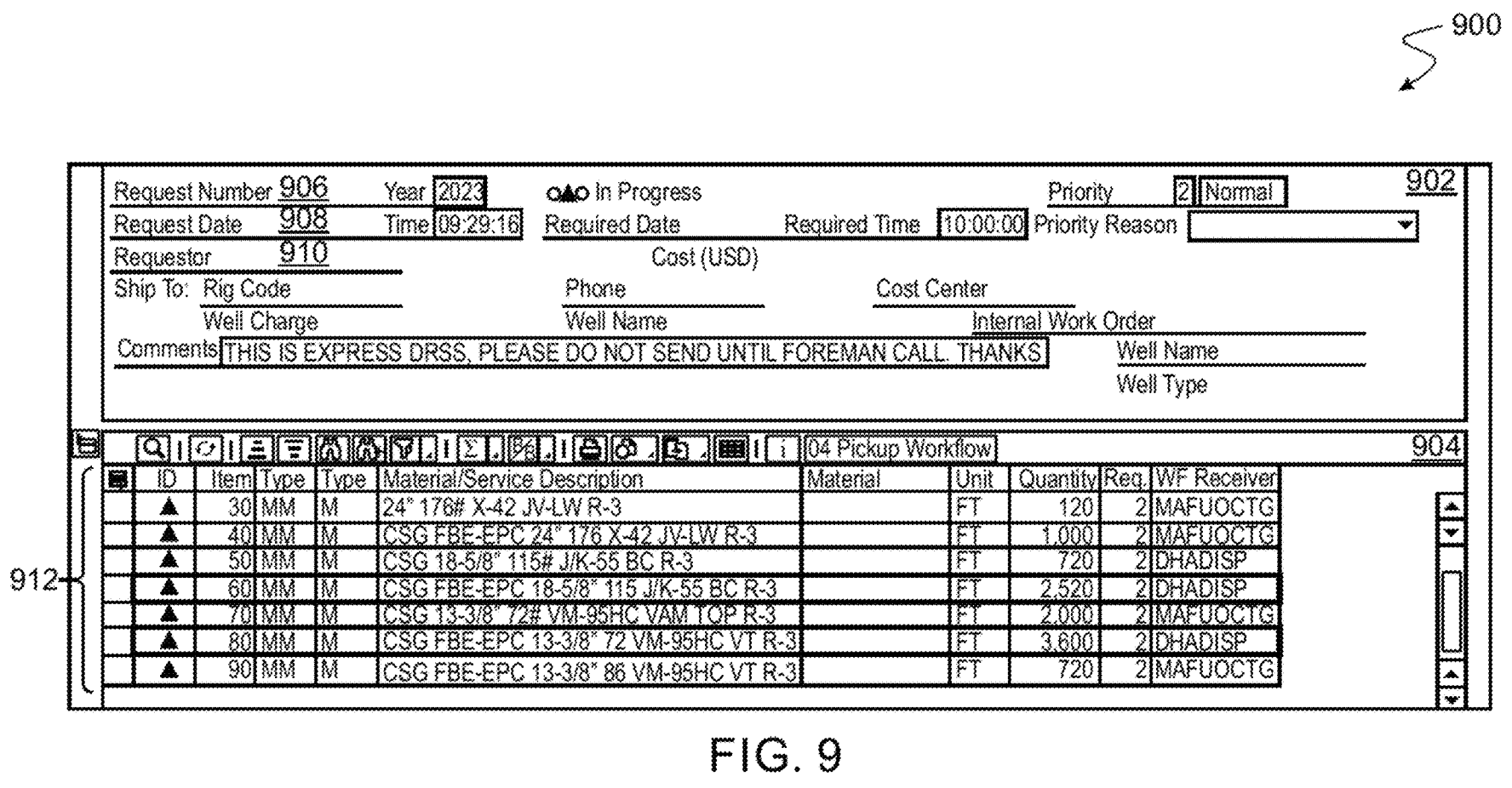

FIG. 9 is a spreadsheet showing an example of a display 900, according to some implementations of the present disclosure. The display 900 includes field entry area 902 for entering and displaying fields for a given request for materials or a service, a data display area 904, a request number 906, a request date 908, requestor 910, and materials/services 912. The display 900 can provide an interface for visualizing the breakdown of each type of operation in the entire well duration to identify productive, non-footage drilling time, and thus possible opportunities of improvement.

Figure 10:
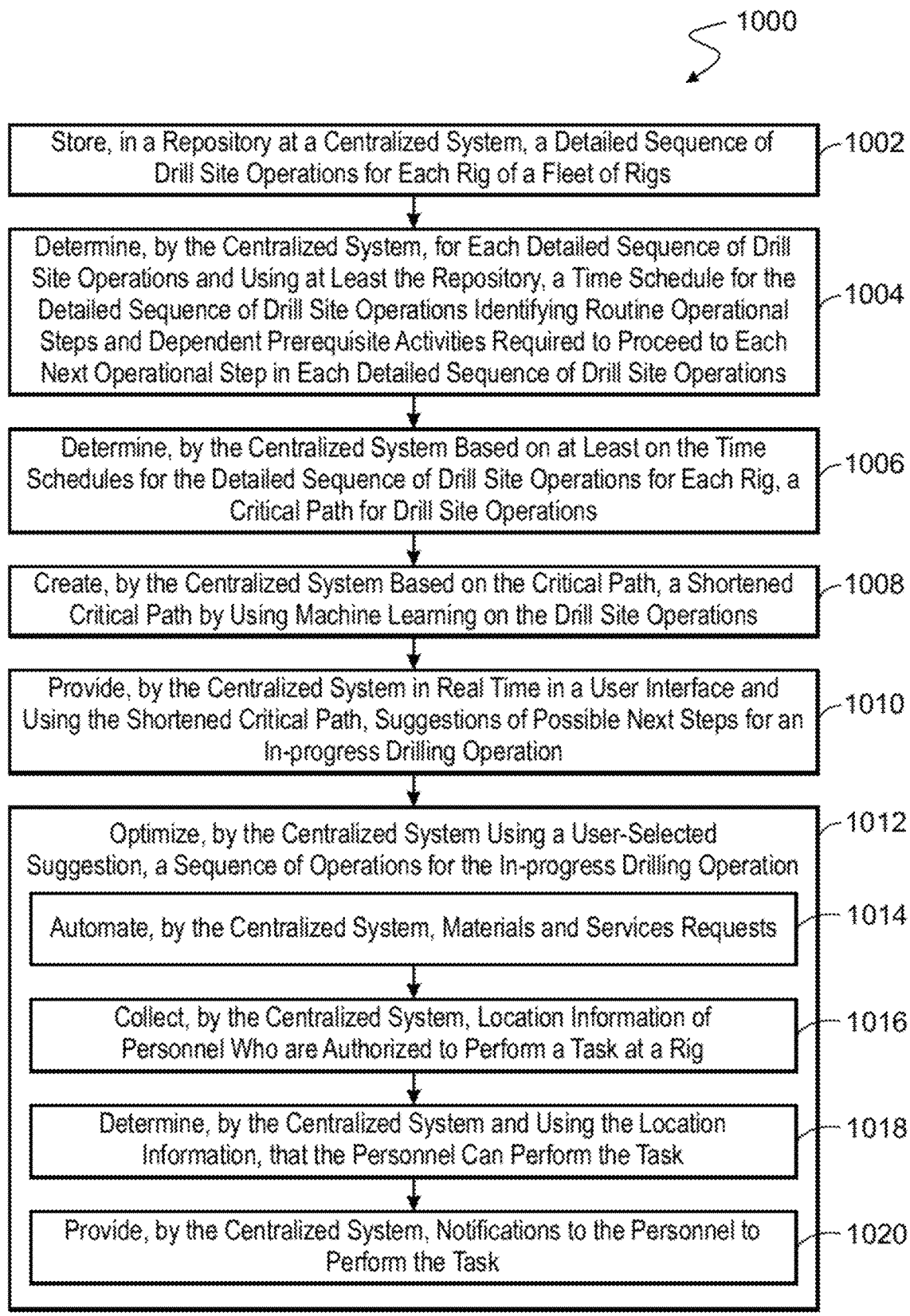
FIG. 10 is a flowchart of an example of a method for optimizing a sequence of operations for an in-progress drilling operation, according to some implementations of the present disclosure.

FIG. 10 is a flowchart of an example of a method 1000 for optimizing a sequence of operations for an in-progress drilling operation, according to some implementations of the present disclosure. For clarity of presentation, the description that follows generally describes method 1000 in the context of the other figures in this description. However, it will be understood that method 1000 can be performed, for example, by any suitable system, environment, software, and hardware, or a combination of systems, environments, software, and hardware, as appropriate. In some implementations, various steps of method 1000 can be run in parallel, in combination, in loops, or in any order.

At 1002, a detailed sequence of drill site operations for each rig of a fleet of rigs is stored in a repository at a centralized system. In some implementations, the detailed sequence of drill site operations for each rig of a fleet of rigs can include roles of personnel capable of performing tasks included in the drill site operations. For example, the sequence of drill site operations can include operations as described with reference to FIG. 2. From 1002, method 1000 proceeds to 1004.

At 1004, a time schedule for the detailed sequence of drill site operations is determined by the centralized system for each detailed sequence of drill site operations. The detailed sequence of drill site operations is determined using the repository and identifies routine operational steps and dependent prerequisite activities required to proceed to each next operational step in each detailed sequence of drill site operations. As an example, the time schedule can be represented as the time chart 702. From 1004, method 1000 proceeds to 1006.

At 1006, a critical path for drill site operations is determined by the centralized system based on at least the time schedules for the detailed sequence of drill site operations for each rig. In some implementations, the time schedule for the detailed sequence of drill site operations includes durations for performing each task of the drill site operations. In some implementations, the critical path can identify an order of tasks to be performed and job roles of personnel capable of performing tasks in the order of tasks to be performed. For example, the critical path can be in a form as described with reference to the example of FIG. 1 and Table 1. From 1006, method 1000 proceeds to 1008.

At 1008, a shortened critical path is created by the centralized system based on the critical path using machine learning on the drill site operations. In some implementations, creating the shortened critical path can include: recording all possible steps at each stage across the fleet of rigs, identifying offline/simultaneous activities, and determining an optimized sequence of drill site operations. As an example, during this process, linear programming techniques can be used in which all constraints are considered for continuously optimizing the best sequence of operations, such as to shorten the total duration of the critical path to create the shortened critical path. From 1008, method 1000 proceeds to 1010.

At 1010, suggestions of possible next steps for an in-progress drilling operation using the shortened critical path are provided in a user interface by the centralized system in real time. In some implementations, providing suggestions of possible next steps for an in-progress drilling operation can include generating a display of: 1) tasks to be performed at the rig and 2) personnel and rig equipment for performing the tasks. An example of a suggestion can be an alert sent to a vendor's vehicle to pick up the cement sample that is to be sent to town for confirmation testing. From 1010, method 1000 proceeds to 1012.

At 1012, a sequence of operations for the in-progress drilling operation is optimized by the centralized system using a user-selected suggestion. For example, optimization can be completed using steps 1014, 1016, 1018, and 1020.

At 1014, materials and services requests are automated by the centralized system. The requests can be issued by the centralized system in real time in anticipation of being needed during the sequence of operations for the in-progress drilling operation. The request can be, for example, to perform a task. From 1014, method 1000 proceeds to 1016.

At 1016, location information of personnel authorized to perform a task at a rig is collected by the centralized system. In some implementations, collecting the location information can include: collecting, from a RFID hub at a rig, locations of RFID chips worn by stand-by personnel and locations of RFID chips installed on rig equipment; and collecting corresponding identifiers of the stand-by personnel and the rig equipment. From 1016, method 1000 proceeds to 1018.

At 1018, a determination is made by the centralized system using the location information that the personnel can perform the task. The personnel can be of a certain role (e.g., a roustabout), for example, authorized to perform a specific task. From 1018, method 1000 proceeds to 1020.

At 1020, notifications to perform the task are provided by the centralized system to the personnel. As an example, the roustabout can be notified to perform the task. After 1020, method 1000 can stop.

In some implementations, in addition to (or in combination with) any previously-described features, techniques of the present disclosure can include the following. Outputs of the techniques of the present disclosure can be performed before, during, or in combination with wellbore operations, such as to provide inputs to change the settings or parameters of equipment used for drilling. Examples of wellbore operations include drilling a wellbore, casing, completing and logging the wellbore, to name a few. The wellbore operations can be triggered or controlled, for example, by outputs of the methods of the present disclosure. In some implementations, customized user interfaces can present intermediate or final results of the above described processes to a user. Information can be presented in one or more textual, tabular, or graphical formats, such as through a dashboard. The information can be presented at one or more on-site locations (such as at oil and gas wells), on the Internet (such as on a webpage), on a mobile application (or "app"), or at a central processing facility. The presented information can include suggestions, such as suggested changes in parameters or processing inputs, that the user can select to implement improvements in the operations management, such as crew assignment, operations sequence, and simultaneous tasks. For example, the suggestions can include parameters that, when selected by the user, can cause a change to, or an improvement in utilization of critical rig equipment, rig crew, and minimizing drilling operations duration. The suggestions, when implemented by the user, can improve the speed and accuracy of operational sequence optimizations, streamline processes, improve models, and solve problems related to efficiency, performance, safety, reliability, costs, downtime, and the need for human interaction. In some implementations, the suggestions can be implemented in real-time, such as to provide an immediate or near-immediate change in operations or in a model. The term real-time can correspond, for example, to events that occur within a specified period of time, such as within one minute or within one second. Events can include readings or measurements captured by rig equipment such as sensors, RFID, bottom hole assemblies, or other equipment. The readings or measurements can be analyzed at the surface, such as by using applications that can include modeling applications and machine learning. The analysis can be used to generate the optimized sequence of operations, the assigned rig crew member, and available rig equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions where only designated crew members are allowed to operate it.

Figure 11:
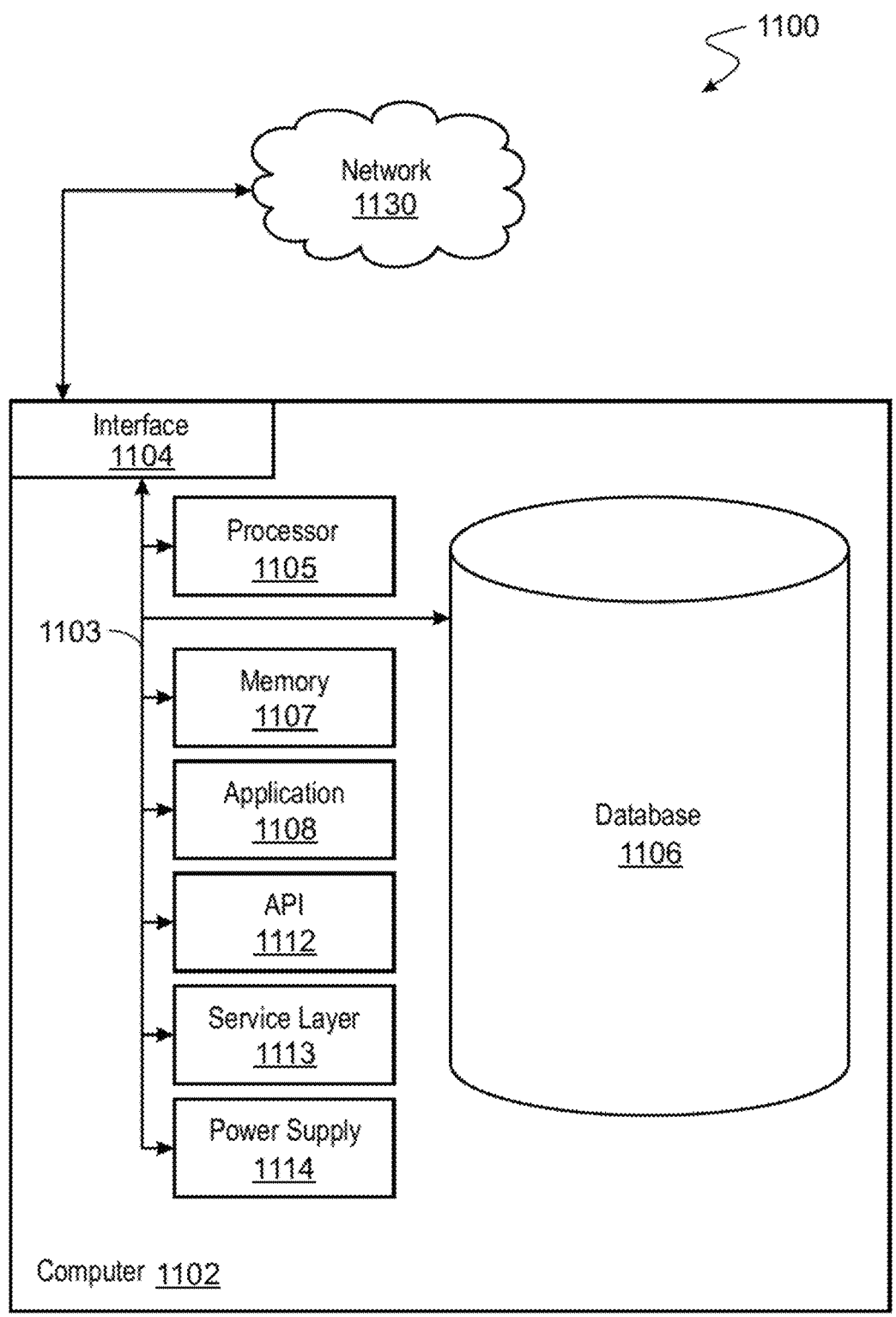
FIG. 11 is a block diagram illustrating an example computer system used to provide computational functionalities associated with described algorithms, methods, functions, processes, flows, and procedures as described in the present disclosure, according to some implementations of the present disclosure.

FIG. 11 is a block diagram of an example computer system 1100 used to provide computational functionalities associated with described algorithms, methods, functions, processes, flows, and procedures described in the present disclosure, according to some implementations of the present disclosure. The illustrated computer 1102 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1102 can include input devices such as keypads, keyboards, and touch screens that can accept user information. Also, the computer 1102 can include output devices that can convey information associated with the operation of the computer 1102. The information can include digital data, visual data, audio information, or a combination of information. The information can be presented in a graphical user interface (UTI) (or GUI).

The computer 1102 can serve in a role as a client, a network component, a server, a database, a persistency, or components of a computer system for performing the subject matter described in the present disclosure. The illustrated computer 1102 is communicably coupled with a network 1130. In some implementations, one or more components of the computer 1102 can be configured to operate within different environments, including cloud-computing-based environments, local environments, global environments, and combinations of environments.

At a top level, the computer 1102 is an electronic computing device operable to receive, transmit, process, store, and manage data and information associated with the described subject matter. According to some implementations, the computer 1102 can also include, or be communicably coupled with, an application server, an email server, a web server, a caching server, a streaming data server, or a combination of servers.

The computer 1102 can receive requests over network 1130 from a client application (for example, executing on another computer 1102). The computer 1102 can respond to the received requests by processing the received requests using software applications. Requests can also be sent to the computer 1102 from internal users (for example, from a command console), external (or third) parties, automated applications, entities, individuals, systems, and computers.

Each of the components of the computer 1102 can communicate using a system bus 1103. In some implementations, any or all of the components of the computer 1102, including hardware or software components, can interface with each other or the interface 1104 (or a combination of both) over the system bus 1103. Interfaces can use an application programming interface (API) 1112, a service layer 1113, or a combination of the API 1112 and service layer 1113. The API 1112 can include specifications for routines, data structures, and object classes. The API 1112 can be either computer-language independent or dependent. The API 1112 can refer to a complete interface, a single function, or a set of APIs.

The service layer 1113 can provide software services to the computer 1102 and other components (whether illustrated or not) that are communicably coupled to the computer 1102. The functionality of the computer 1102 can be accessible for all service consumers using this service layer. Software services, such as those provided by the service layer 1113, can provide reusable, defined functionalities through a defined interface. For example, the interface can be software written in JAVA, C++, or a language providing data in extensible markup language (XML) format. While illustrated as an integrated component of the computer 1102, in alternative implementations, the API 1112 or the service layer 1113 can be stand-alone components in relation to other components of the computer 1102 and other components communicably coupled to the computer 1102. Moreover, any or all parts of the API 1112 or the service layer 1113 can be implemented as child or sub-modules of another software module, enterprise application, or hardware module without departing from the scope of the present disclosure.

The computer 1102 includes an interface 1104. Although illustrated as a single interface 1104 in FIG. 11, two or more interfaces 1104 can be used according to particular needs, desires, or particular implementations of the computer 1102 and the described functionality. The interface 1104 can be used by the computer 1102 for communicating with other systems that are connected to the network 1130 (whether illustrated or not) in a distributed environment. Generally, the interface 1104 can include, or be implemented using, logic encoded in software or hardware (or a combination of software and hardware) operable to communicate with the network 1130. More specifically, the interface 1104 can include software supporting one or more communication protocols associated with communications. As such, the network 1130 or the interface's hardware can be operable to communicate physical signals within and outside of the illustrated computer 1102.

The computer 1102 includes a processor 1105. Although illustrated as a single processor 1105 in FIG. 11, two or more processors 1105 can be used according to particular needs, desires, or particular implementations of the computer 1102 and the described functionality. Generally, the processor 1105 can execute instructions and can manipulate data to perform the operations of the computer 1102, including operations using algorithms, methods, functions, processes, flows, and procedures as described in the present disclosure.

The computer 1102 also includes a database 1106 that can hold data for the computer 1102 and other components connected to the network 1130 (whether illustrated or not). For example, database 1106 can be an in-memory, conventional, or a database storing data consistent with the present disclosure. In some implementations, database 1106 can be a combination of two or more different database types (for example, hybrid in-memory and conventional databases) according to particular needs, desires, or particular implementations of the computer 1102 and the described functionality. Although illustrated as a single database 1106 in FIG. 11, two or more databases (of the same, different, or a combination of types) can be used according to particular needs, desires, or particular implementations of the computer 1102 and the described functionality. While database 1106 is illustrated as an internal component of the computer 1102, in alternative implementations, database 1106 can be external to the computer 1102.

The computer 1102 also includes a memory 1107 that can hold data for the computer 1102 or a combination of components connected to the network 1130 (whether illustrated or not). Memory 1107 can store any data consistent with the present disclosure. In some implementations, memory 1107 can be a combination of two or more different types of memory (for example, a combination of semiconductor and magnetic storage) according to particular needs, desires, or particular implementations of the computer 1102 and the described functionality. Although illustrated as a single memory 1107 in FIG. 11, two or more memories 1107 (of the same, different, or combination of types) can be used according to particular needs, desires, or particular implementations of the computer 1102 and the described functionality. While memory 1107 is illustrated as an internal component of the computer 1102, in alternative implementations, memory 1107 can be external to the computer 1102.

The application 1108 can be an algorithmic software engine providing functionality according to particular needs, desires, or particular implementations of the computer 1102 and the described functionality. For example, application 1108 can serve as one or more components, modules, or applications. Further, although illustrated as a single application 1108, the application 1108 can be implemented as multiple applications 1108 on the computer 1102. In addition, although illustrated as internal to the computer 1102, in alternative implementations, the application 1108 can be external to the computer 1102.

The computer 1102 can also include a power supply 1114. The power supply 1114 can include a rechargeable or non-rechargeable battery that can be configured to be either user- or non-user-replaceable. In some implementations, the power supply 1114 can include power-conversion and management circuits, including recharging, standby, and power management functionalities. In some implementations, the power supply 1114 can include a power plug to allow the computer 1102 to be plugged into a wall socket or a power source to, for example, power the computer 1102 or recharge a rechargeable battery.

There can be any number of computers 1102 associated with, or external to, a computer system containing computer 1102, with each computer 1102 communicating over network 1130. Further, the terms "client," "user," and other appropriate terminology can be used interchangeably, as appropriate, without departing from the scope of the present disclosure. Moreover, the present disclosure contemplates that many users can use one computer 1102 and one user can use multiple computers 1102.

Described implementations of the subject matter can include one or more features, alone or in combination.

For example, in a first implementation, a computer-implemented method includes the following. A detailed sequence of drill site operations for each rig of a fleet of rigs is stored in a repository at a centralized system. A time schedule for the detailed sequence of drill site operations is determined by the centralized system for each detailed sequence of drill site operations. The detailed sequence of drill site operations is determined using the repository and identifies routine operational steps and dependent prerequisite activities required to proceed to each next operational step in each detailed sequence of drill site operations. A critical path for drill site operations is determined by the centralized system based on at least the time schedules for the detailed sequence of drill site operations for each rig. A shortened critical path is created by the centralized system based on the critical path using machine learning on the drill site operations. Suggestions of possible next steps for an in-progress drilling operation using the shortened critical path are provided in a user interface by the centralized system in real time. A sequence of operations for the in-progress drilling operation is optimized by the centralized system using a user-selected suggestion. Materials and services requests are automated by the centralized system. Location information of personnel authorized to perform a task at a rig is collected by the centralized system. A determination is made by the centralized system using the location information that the personnel can perform the task. Notifications to perform the task are provided by the centralized system to the personnel.

The foregoing and other described implementations can each, optionally, include one or more of the following features:

A first feature, combinable with any of the following features, where collecting the location information: collecting, from a radio frequency identification (RFID) hub at a rig, locations of RFID chips worn by stand-by personnel and locations of RFID chips installed on rig equipment; and collecting corresponding identifiers of the stand-by personnel and the rig equipment.

A second feature, combinable with any of the previous or following features, where detailed sequence of drill site operations for each rig of a fleet of rigs includes roles of personnel capable of performing tasks included in the drill site operations.

A third feature, combinable with any of the previous or following features, where the time schedule for the detailed sequence of drill site operations includes durations for performing each task of the drill site operations.

A fourth feature, combinable with any of the previous or following features, where the critical path identifies an order of tasks to be performed and job roles of personnel capable of performing tasks in the order of tasks to be performed.

A fifth feature, combinable with any of the previous or following features, where providing the suggestions of possible next steps for an in-progress drilling operation includes generating a display of: 1) tasks to be performed at the rig and 2) personnel and rig equipment for performing the tasks.

A sixth feature, combinable with any of the previous or following features, where creating the shortened critical path includes: recording all possible steps at each stage across the fleet of rigs; identifying offline/simultaneous activities; and determining an optimized sequence of drill site operations.

In a second implementation, a non-transitory, computer-readable medium stores one or more instructions executable by a computer system to perform operations including the following. A detailed sequence of drill site operations for each rig of a fleet of rigs is stored in a repository at a centralized system. A time schedule for the detailed sequence of drill site operations is determined by the centralized system for each detailed sequence of drill site operations. The detailed sequence of drill site operations is determined using the repository and identifies routine operational steps and dependent prerequisite activities required to proceed to each next operational step in each detailed sequence of drill site operations. A critical path for drill site operations is determined by the centralized system based on at least the time schedules for the detailed sequence of drill site operations for each rig. A shortened critical path is created by the centralized system based on the critical path using machine learning on the drill site operations. Suggestions of possible next steps for an in-progress drilling operation using the shortened critical path are provided in a user interface by the centralized system in real time. A sequence of operations for the in-progress drilling operation is optimized by the centralized system using a user-selected suggestion. Materials and services requests are automated by the centralized system. Location information of personnel authorized to perform a task at a rig is collected by the centralized system. A determination is made by the centralized system using the location information that the personnel can perform the task. Notifications to perform the task are provided by the centralized system to the personnel.

The foregoing and other described implementations can each, optionally, include one or more of the following features:

A first feature, combinable with any of the following features, where collecting the location information: collecting, from a radio frequency identification (RFID) hub at a rig, locations of RFID chips worn by stand-by personnel and locations of RFID chips installed on rig equipment; and collecting corresponding identifiers of the stand-by personnel and the rig equipment.

A second feature, combinable with any of the previous or following features, where detailed sequence of drill site operations for each rig of a fleet of rigs includes roles of personnel capable of performing tasks included in the drill site operations.

A third feature, combinable with any of the previous or following features, where the time schedule for the detailed sequence of drill site operations includes durations for performing each task of the drill site operations.

A fourth feature, combinable with any of the previous or following features, where the critical path identifies an order of tasks to be performed and job roles of personnel capable of performing tasks in the order of tasks to be performed.

A fifth feature, combinable with any of the previous or following features, where providing the suggestions of possible next steps for an in-progress drilling operation includes generating a display of: 1) tasks to be performed at the rig and 2) personnel and rig equipment for performing the tasks.

A sixth feature, combinable with any of the previous or following features, where creating the shortened critical path includes: recording all possible steps at each stage across the fleet of rigs; identifying offline/simultaneous activities; and determining an optimized sequence of drill site operations.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. A detailed sequence of drill site operations for each rig of a fleet of rigs is stored in a repository at a centralized system. A time schedule for the detailed sequence of drill site operations is determined by the centralized system for each detailed sequence of drill site operations. The detailed sequence of drill site operations is determined using the repository and identifies routine operational steps and dependent prerequisite activities required to proceed to each next operational step in each detailed sequence of drill site operations. A critical path for drill site operations is determined by the centralized system based on at least the time schedules for the detailed sequence of drill site operations for each rig. A shortened critical path is created by the centralized system based on the critical path using machine learning on the drill site operations. Suggestions of possible next steps for an in-progress drilling operation using the shortened critical path are provided in a user interface by the centralized system in real time. A sequence of operations for the in-progress drilling operation is optimized by the centralized system using a user-selected suggestion. Materials and services requests are automated by the centralized system. Location information of personnel authorized to perform a task at a rig is collected by the centralized system. A determination is made by the centralized system using the location information that the personnel can perform the task. Notifications to perform the task are provided by the centralized system to the personnel.

The foregoing and other described implementations can each, optionally, include one or more of the following features:

A first feature, combinable with any of the following features, where collecting the location information: collecting, from a radio frequency identification (RFID) hub at a rig, locations of RFID chips worn by stand-by personnel and locations of RFID chips installed on rig equipment; and collecting corresponding identifiers of the stand-by personnel and the rig equipment.

A second feature, combinable with any of the previous or following features, where detailed sequence of drill site operations for each rig of a fleet of rigs includes roles of personnel capable of performing tasks included in the drill site operations.

A third feature, combinable with any of the previous or following features, where the time schedule for the detailed sequence of drill site operations includes durations for performing each task of the drill site operations.

A fourth feature, combinable with any of the previous or following features, where the critical path identifies an order of tasks to be performed and job roles of personnel capable of performing tasks in the order of tasks to be performed.

A fifth feature, combinable with any of the previous or following features, where providing the suggestions of possible next steps for an in-progress drilling operation includes generating a display of: 1) tasks to be performed at the rig and 2) personnel and rig equipment for performing the tasks.

A sixth feature, combinable with any of the previous or following features, where creating the shortened critical path includes: recording all possible steps at each stage across the fleet of rigs; identifying offline/simultaneous activities; and determining an optimized sequence of drill site operations.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)." "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access and/or interact with the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN)(for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at the application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
    storing, in a repository at a centralized system, a detailed sequence of drill site operations for each rig of a fleet of rigs;
    determining, by the centralized system, for each detailed sequence of drill site operations and using at least the repository, a time schedule for the detailed sequence of drill site operations identifying routine operational steps and dependent prerequisite activities required to proceed to each next operational step in each detailed sequence of drill site operations;
    determining, by the centralized system based on at least the time schedules for the detailed sequence of drill site operations for each rig, a critical path for drill site operations;
    creating, by the centralized system based on the critical path, a shortened critical path by using machine learning on the drill site operations;
    providing, by the centralized system in real time in a user interface and using the shortened critical path, suggestions of possible next steps for an in-progress drilling operation; and
    optimizing, by the centralized system using a user-selected suggestion, a sequence of operations for the in-progress drilling operation, comprising:
        automating, by the centralized system, materials and services requests;
        collecting, by the centralized system, location information of personnel authorized to perform a task at a rig by collecting, from a radio frequency identification (RFID) hub at a ria, locations of RFID chins worn by stand-by personnel and locations of RFID chins installed on a rig equipment and by collecting corresponding identifiers of the stand-by personnel and the rig equipment;
        determining, by the centralized system and using the location information, that the personnel can perform the task; and
        providing, by the centralized system, notifications to the personnel to perform the task.

2. The computer-implemented method of claim 1, wherein detailed sequence of drill site operations for each rig of a fleet of rigs comprises roles of personnel capable of performing tasks included in the drill site operations.

3. The computer-implemented method of claim 1, wherein the time schedule for the detailed sequence of drill site operations comprises durations for performing each task of the drill site operations.

4. The computer-implemented method of claim 1, wherein the critical path identifies an order of tasks to be performed and job roles of personnel capable of performing tasks in the order of tasks to be performed.

5. The computer-implemented method of claim 1, wherein providing the suggestions of possible next steps for an in-progress drilling operation comprises generating a display of: 1) tasks to be performed at the rig and 2) personnel and rig equipment for performing the tasks.

6. The computer-implemented method of claim 1, wherein creating the shortened critical path comprises:
    recording all possible steps at each stage across the fleet of rigs;
    identifying offline/simultaneous activities; and
    determining an optimized sequence of drill site operations.

7. A non-transitory, computer-readable medium storing one or more instructions executable by a computer system to perform operations comprising:
    storing, in a repository at a centralized system, a detailed sequence of drill site operations for each rig of a fleet of rigs;
    determining, by the centralized system, for each detailed sequence of drill site operations and using at least the repository, a time schedule for the detailed sequence of drill site operations identifying routine operational steps and dependent prerequisite activities required to proceed to each next operational step in each detailed sequence of drill site operations;
    determining, by the centralized system based on at least the time schedules for the detailed sequence of drill site operations for each rig, a critical path for drill site operations;
    creating, by the centralized system based on the critical path, a shortened critical path by using machine learning on the drill site operations;
    providing, by the centralized system in real time in a user interface and using the shortened critical path, suggestions of possible next steps for an in-progress drilling operation; and
    optimizing, by the centralized system using a user-selected suggestion, a sequence of operations for the in-progress drilling operation, comprising:
        automating, by the centralized system, materials and services requests;
        collecting, by the centralized system, location information of personnel authorized to perform a task at a rig by collecting, from a radio frequency identification (RFID) hub at a ria, locations of RFID chins worn by stand-by personnel and locations of RFID chins installed on a rig equipment and by collecting corresponding identifiers of the stand-by personnel and the rig equipment;
        determining, by the centralized system and using the location information, that the personnel can perform the task; and
        providing, by the centralized system, notifications to the personnel to perform the task.

8. The non-transitory, computer-readable medium of claim 7, wherein detailed sequence of drill site operations for each rig of a fleet of rigs comprises roles of personnel capable of performing tasks included in the drill site operations.

9. The non-transitory, computer-readable medium of claim 7, wherein the time schedule for the detailed sequence of drill site operations comprises durations for performing each task of the drill site operations.

10. The non-transitory, computer-readable medium of claim 7, wherein the critical path identifies an order of tasks to be performed and job roles of personnel capable of performing tasks in the order of tasks to be performed.

11. The non-transitory, computer-readable medium of claim 7, wherein providing the suggestions of possible next steps for an in-progress drilling operation comprises generating a display of: 1) tasks to be performed at the rig and 2) personnel and rig equipment for performing the tasks.

12. The non-transitory, computer-readable medium of claim 7, wherein creating the shortened critical path comprises:

recording all possible steps at each stage across the fleet of rigs;
identifying offline/simultaneous activities; and
determining an optimized sequence of drill site operations.

13. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
  storing, in a repository at a centralized system, a detailed sequence of drill site operations for each rig of a fleet of rigs;
  determining, by the centralized system, for each detailed sequence of drill site operations and using at least the repository, a time schedule for the detailed sequence of drill site operations identifying routine operational steps and dependent prerequisite activities required to proceed to each next operational step in each detailed sequence of drill site operations;
  determining, by the centralized system based on at least the time schedules for the detailed sequence of drill site operations for each rig, a critical path for drill site operations;
  creating, by the centralized system based on the critical path, a shortened critical path by using machine learning on the drill site operations;
  providing, by the centralized system in real time in a user interface and using the shortened critical path, suggestions of possible next steps for an in-progress drilling operation; and
  optimizing, by the centralized system using a user-selected suggestion, a sequence of operations for the in-progress drilling operation, comprising:
    automating, by the centralized system, materials and services requests;
    collecting, by the centralized system, location information of personnel authorized to perform a task at a rig by collecting, from a radio frequency identification (RFID) hub at a ria, locations of RFID chins worn by stand-by personnel and locations of RFID chins installed on a rig equipment and by collecting corresponding identifiers of the stand-by personnel and the rig equipment;
    determining, by the centralized system and using the location information, that the personnel can perform the task; and
    providing, by the centralized system, notifications to the personnel to perform the task.

14. The computer-implemented system of claim 13, wherein detailed sequence of drill site operations for each rig of a fleet of rigs comprises roles of personnel capable of performing tasks included in the drill site operations.

15. The computer-implemented system of claim 13, wherein the time schedule for the detailed sequence of drill site operations comprises durations for performing each task of the drill site operations.

16. The computer-implemented system of claim 13, wherein the critical path identifies an order of tasks to be performed and job roles of personnel capable of performing tasks in the order of tasks to be performed.

17. The computer-implemented system of claim 13, wherein providing the suggestions of possible next steps for an in-progress drilling operation comprises generating a display of: 1) tasks to be performed at the rig and 2) personnel and rig equipment for performing the tasks.

* * * * *

UNITED STATES PATENT AND TRADEMARK OFFICE
CERTIFICATE OF CORRECTION

PATENT NO. : 12,182,654 B1  
APPLICATION NO. : 18/339776  
DATED : December 31, 2024  
INVENTOR(S) : Ryan Majdi Arab Page 1 of 1

It is certified that error appears in the above-identified patent and that said Letters Patent is hereby corrected as shown below:

In the Claims

Column 23, Line 37, Claim 1, please replace "ria," with -- rig, --;

Column 23, Line 37, Claim 1, please replace "chins" with -- chips --;

Column 23, Line 38, Claim 1, please replace "chins" with -- chips --;

Column 24, Line 37, Claim 7, please replace "ria," with -- rig, --;

Column 24, Line 37, Claim 7, please replace "chins" with -- chips --;

Column 24, Line 38, Claim 7, please replace "chins" with -- chips --;

Column 26, Line 9, Claim 13, please replace "ria," with -- rig, --;

Column 26, Line 10, Claim 13, please replace "chins" with -- chips --;

Column 26, Line 11, Claim 13, please replace "chins" with -- chips --.

Signed and Sealed this  
Eighteenth Day of February, 2025

Coke Morgan Stewart  
*Acting Director of the United States Patent and Trademark Office*